United States Patent
Hamaguchi (10) Patent No.: US 10,216,590 B2
(45) Date of Patent: Feb. 26, 2019

(54) COMMUNICATION CONTROL DETERMINATION OF STORING STATE BASED ON A REQUESTED DATA OPERATION AND A SCHEMA OF A TABLE THAT STORES THEREIN DATA TO BE OPERATED BY THE DATA OPERATION

(71) Applicant: KABUSHIKI KAISHA TOSHIBA, Minato-ku, Tokyo (JP)

(72) Inventor: Taihei Hamaguchi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 235 days.

(21) Appl. No.: 15/408,481

(22) Filed: Jan. 18, 2017

(65) Prior Publication Data

US 2017/0212810 A1    Jul. 27, 2017

(30) Foreign Application Priority Data

Jan. 22, 2016   (JP) .................................. 2016-011026

(51) Int. Cl.
*G06F 11/14* (2006.01)
*G06F 17/30* (2006.01)
(Continued)

(52) U.S. Cl.
CPC .... *G06F 11/1474* (2013.01); *G06F 17/30227* (2013.01); *G06F 17/30283* (2013.01);
(Continued)

(58) Field of Classification Search
CPC ............. G06F 11/1402; G06F 11/1405; G06F 11/1407; G06F 11/2023; G06F 11/2028;
(Continued)

(56) References Cited

U.S. PATENT DOCUMENTS 7,881,215 B1 * 2/2011 Daigle .................. H04L 67/142
                                                              370/252
8,897,154 B2 * 11/2014 Jalan .................... H04L 67/1027
                                                              370/252

(Continued)

FOREIGN PATENT DOCUMENTS

| JP | 2003-203000 | 7/2003 |
| JP | 2013-502642 | 1/2013 |
| WO | 2007/019034 | 2/2007 |

OTHER PUBLICATIONS

Ozasa, et al. "Measure of failure for the company infrastructure", IEICE Technical Report, Dec. 2008.

*Primary Examiner* — Gabriel Chu
(74) *Attorney, Agent, or Firm* — Amin, Turocy & Watson LLP (57) ABSTRACT

A communication control device includes a determining unit, a request unit, a storage control unit, and a recovery unit. The determining unit determines, based on a requested data operation and a schema of a table that stores therein data to be operated by the data operation, any one of a first operation method of storing state information indicating a state of the data operation and a second operation method of avoiding storing the state information as a method for the data operation. The request unit requests server devices to execute the data operation. The storage control unit stores, when the first operation method is determined, the state information in a storage unit upon execution of the data operation. The recovery unit recovers, when a failure occurs upon the execution of the data operation, from the failure by a recovery method suited to the operation method determined by the determining unit.

11 Claims, 6 Drawing Sheets

(51) Int. Cl.
*H04L 1/08* (2006.01)
*H04L 1/18* (2006.01)

(52) U.S. Cl.
CPC .. *G06F 17/30294* (2013.01); *G06F 17/30312* (2013.01); *G06F 17/30371* (2013.01); *G06F 17/30377* (2013.01); *H04L 1/08* (2013.01); *H04L 1/1867* (2013.01)

(58) Field of Classification Search
CPC .......... G06F 11/2069; G06F 17/30371; G06F 17/30377; G06F 17/30292; G06F 17/30392; G06F 11/1458; G06F 11/1464; G06F 11/1474; G06F 17/30227; Y10S 707/99941
See application file for complete search history.

(56) References Cited

U.S. PATENT DOCUMENTS

| | | | |
|---|---|---|---|
| 9,465,589 B2* | 10/2016 | Shukla | G06F 8/20 |
| 2004/0261022 A1 | 12/2004 | Deutesfeld et al. | |
| 2007/0033157 A1 | 2/2007 | Gray | |
| 2009/0006539 A1* | 1/2009 | Degenkolb | H04L 67/14 |
| | | | 709/203 |
| 2011/0040826 A1 | 2/2011 | Chadzelek et al. | |
| 2011/0047554 A1 | 2/2011 | Lakshmanan et al. | |
| 2013/0254778 A1 | 9/2013 | Lakshmanan et al. | |
| 2017/0212810 A1* | 7/2017 | Hamaguchi | G06F 11/1464 |

* cited by examiner

COMMUNICATION CONTROL DETERMINATION OF STORING STATE BASED ON A REQUESTED DATA OPERATION AND A SCHEMA OF A TABLE THAT STORES THEREIN DATA TO BE OPERATED BY THE DATA OPERATION

CROSS-REFERENCE TO RELATED APPLICATIONS

This application is based upon and claims the benefit of priority from Japanese Patent Application No. 2016-011026, filed on Jan. 22, 2016; the entire contents of which are incorporated herein by reference.

FIELD

Embodiments described herein relate generally to a communication control device, a communication control method, a computer program, and a communication system.

BACKGROUND

Transparent failover is a known example of technology for enhancing the availability of a distributed database management system. In the transparent failover, even when an abnormality occurs in a distributed server or in a connection path to a distributed server in the course of processing of a request from an application, the connection destination of the application is automatically switched to another distributed server.

A method of implementing failover is different depending on a data model of a distributed database to be operated or operation contents. For example, in a distributed key-value store involving no transaction control, failover can be implemented by repeatedly issuing a registration request until a normal response is obtained from an appropriately selected distributed server. For a distributed database involving transaction control, transparent failover based on a distributed protocol, such as the three-phase commit protocol, is known.

DETAILED DESCRIPTION

A communication control device according to an embodiment includes a determining unit, a request unit, a storage control unit, and a recovery unit. The determining unit determines, based on a requested data operation and a schema of a table that stores therein data to be operated by the data operation, any one of a first operation method of storing state information indicating a state of the data operation and a second operation method of avoiding storing the state information as a method for the data operation. The request unit requests server devices to execute the data operation. The storage control unit stores, when the first operation method is determined, the state information in a storage unit upon execution of the data operation. The recovery unit recovers, when a failure occurs upon the execution of the data operation, from the failure by a recovery method suited to the operation method determined by the determining unit.

For example, when one application handles massive data having both of the structures described above, development cost or response performance is inevitably sacrificed. For example, a method of using two different types of distributed databases or a method of using only a distributed key-value store in which data sets that need to be consistent as a huge value are handled as a result of a major review of the data structure, the configuration is complicated to increase development cost. Response performance is sacrificed in a method of using only a distributed database involving transaction control.

Referring to the accompanying drawings, a communication control device according to exemplary embodiments of the present invention is described in detail below.

As described above, the failover implementation method is different depending on a data model of a distributed database to be operated or the like. Failover in a distributed key-value store involving no transaction control is further described. Assume a case where a record consisting of a pair of a key and a value is registered by a client.

In this case, information for identifying a sequence of individual record operations, such as the start or end of a transaction, is not recorded in a distributed server. Thus, when connection to a requested distributed server is eliminated during a wait for a success response to a registration request, the client cannot investigate whether the registration operation itself has been completed even if the client makes a connection to the same distributed server again for inquiry. A key in a database has the property of being able to specify a record uniquely. Transparent failover in a client can thus be implemented simply by selecting an appropriate distributed server as needed and repeatedly issuing a record registration request until a normal response from the distributed server is obtained, irrespective of the reflected state of the record registration operation.

Next, failover of a distributed database involving transaction control is described. In a distributed database involving transaction control, transparent failover is performed on the basis of a distributed protocol, such as the three-phase commit protocol, to guarantee also the consistency of operation for data with which records cannot be uniquely specified. In contrast to a distributed key-value store, however, transparent failover needs complicated processing for guaranteeing the consistency. For example, in order to commit a transaction in a distributed system based on the three-phase commit protocol, in order to prevent a difference in reflected state of records even when a failure has occurred in a part of relevant distributed servers, the commitment of a transaction is advanced after the process transitions to a state such as a preparation state for waiting for registration at another distributed server. The process transitions require a certain number of communications in addition to a communication for record registration. Thus, when it is supposed that the determination processing for uniqueness can be ignored as compared with communication response waiting time, if data that can be managed also by a distributed key-value store is attempted to be registered, the response time is increased by an increased number of communications for transaction control. Particularly when the commit setting in which a transaction is committed for each individual data operation request is enabled, the difference in response time is noticeable.

Building a database application requiring high response performance thus needs a selection of an optimal database depending on the data structure to be handled and the type of possible data operation. For example, a distributed key-value store in which scale performance can be expected is suited for the case where only data whose consistency among values is not relatively important, such as sensor data, is handled in high volume. A distributed database involving transaction control is suited for the case where data whose consistency among values is important, such as a list of sensors and attribute information, is handled.

As described above, when one application handles massive data having both of the structures, it is desired to solve the problem in that the database structure is complicated to increase development cost or that the response performance deteriorates.

In the present embodiment, a method for data operation (operation method) to be applied is switched on the basis of the schema (structure) of the table to be operated or the like. For example, when it is chosen to apply an operation method in which the state of data operation needs to be managed for recovery from a failure, control of storing information (state information) indicating the state of data operation is executed in the data operation.

For example, the schema of the table to be operated is stored in a client of a distributed database. The schema includes constraint information between records and between tables, such as the uniqueness of a target record. For example, the client selects an operation method on the basis of constraint information defined for each schema such that the number of communications necessary for maintaining the availability and the consistency is reduced to minimum.

A server (distributed server) configured to manage a client and a distributed database has the function of storing operation sequences therein as necessary. The operation sequence is information indicating one or more associated data operations. Examples of the operation sequence include information identifying one or more data operations included in one transaction. The operation sequence is an example of state information indicating a state of the data operation.

Upon detection of a failure, a client executes recovery processing from the failure by a failure recovery method suited to the selected operation method. A specific example of the recovery processing is described below.

Consider an example of executing a single transaction in which, in a table having a primary key, an "INSERT OR REPLACE" statement is requested in SQL or record replacement corresponding to a PUT instruction is requested in a key-value store to define the change contents. In such an example, if a failure occurs in a connection path or in a connected distributed server, it is only necessary to establish the connection again and transmit the same request again. This is because it is expected for an operation for the table having such a schema that the contents of the table are kept the same even after the repeated execution of the operation. On the distributed server, the execution state of the transaction need not be stored, and a transaction control instruction need not be transmitted before and after the execution of the transaction. Thus, the data operation can be implemented only by stateless operation involving no control of the execution state.

Next, consider an example of executing a single transaction consisting of an "INSERT" statement for a table having no primary key. In such an example, when a failure has occurred, if the same request is simply retried after reconnection, an unintended result such as the occurrence of double registration may be obtained. This is because whether an intended record needs to be registered again cannot be determined by only the contents of the table by definition of the schema. In order to enable the determination to be available, it is necessary to identify a sequence of registration operation. For example, communication for sharing identification information on the operation sequence in advance and an operation of managing the operation sequence are performed between the client and the distributed server. In this manner, the client can identify the sequence of registration operation. In other words, the data operation can be implemented by a stateful operation involving the control of execution state. However, as compared with operation for a table having a primary key, the response performance may be affected because of the addition of the processing such as the management of the execution state and the previous communication related to the identification information.

Determining the property such as whether the table has a primary key and switching to an optimum operation method requires the functions of acquiring and storing the schema and analyzing operation instructions. In the present embodiment, it is determined whether statelessness is present on the basis of a combination of the result of analyzing the operation instructions and the schema, and an appropriate operation method is selected. This configuration enables the cost of managing the execution state and the number of communications to be reduced.

Figure 1:
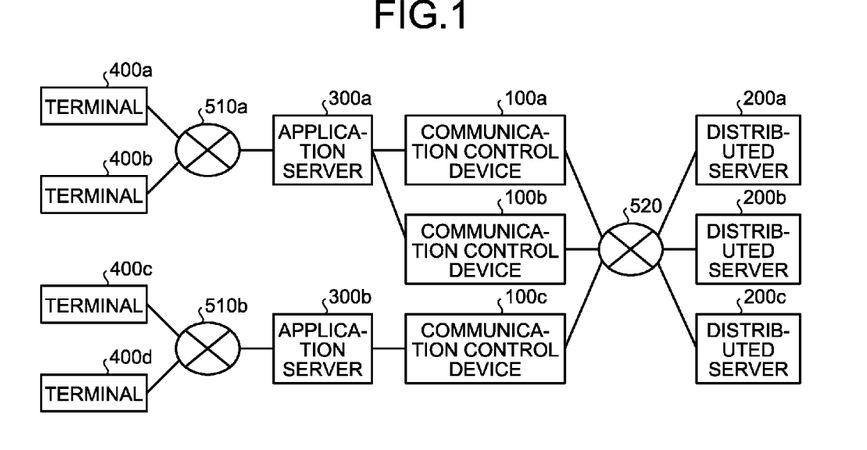
FIG. 1 is a block diagram illustrating a configuration example of a communication system according to an embodiment.

FIG. 1 is a block diagram illustrating a configuration example of a communication system according to the present embodiment. As illustrated in FIG. 1, the communication system according to the present embodiment includes terminals 400a, 400b, 400c, and 400d, application servers 300a and 300b, communication control devices 100a, 100b, and 100c, and distributed servers 200a, 200b, and 200c.

The terminals 400a and 400b are connected to the application server 300a via a network 510a. The terminals 400c and 400d are connected to the application server 300b via a network 510b. The communication control devices 100a, 100b, and 100c are connected to the distributed servers 200a, 200b, and 200c via a network 520.

For example, the networks 510a and 510b are wide area networks (WANs). For example, the network 520 is a local area network (LAN). The network configuration is not limited thereto, and any conventionally used network configuration can be applied. For example, the networks 510a and 510b may be integrated into a single network or divided into three or more networks.

The terminals 400a, 400b, 400c, and 400d have the same configuration, and are thus sometimes referred to simply as "terminal 400" unless otherwise distinguished. Similarly, the application servers 300a and 300b are sometimes referred to simply as "application server 300", the communication control devices 100a, 100b, and 100c are sometimes referred to simply as "communication control device 100", and the distributed servers 200a, 200b, and 200c are sometimes referred to simply as "distributed server 200". The numbers of the respective devices (terminal 400, application server 300, communication control device 100, and distributed server 200) are not limited to the illustrated ones and can be freely selected.

The terminal 400 is a device such as a personal computer used by a user. The application server 300 is a server device configured to provide applications or the like to be used via the terminal 400.

The communication control device 100 controls communication between the application server 300 and the distributed server 200. For example, the communication control device 100 controls processing of operating data stored in the distributed server 200 in response to a request from an application or the like running on the application server 300. The communication control device 100 may be configured as a client module (a computer program of a Java (trademark) database connectivity (JDBC) driver, an open database connectivity (ODBC) driver, a database driver, or the like) embedded in the application server 300, or configured as a computer program that runs on a device independent of the application server 300 or on the application server 300.

The distributed server 200 is a server device configured to store therein data in a distributed manner. A plurality of the distributed servers 200 constitute a distributed database management system. For example, the same data is stored in the distributed servers 200 in a multiple manner. A database managed by the distributed server 200 may have both a table having a primary key and a table having no primary key. The determination of the schema, such as the presence/absence of a primary key, is executed for each table.

When a user uses an application running on the application server 300 with the terminal 400, an operation request for acquisition or change occurs to the database as necessary. The operation request is transmitted to the distributed servers 200 via the communication control device 100, and data stored in any one of the distributed servers 200 is operated.

Figure 2:
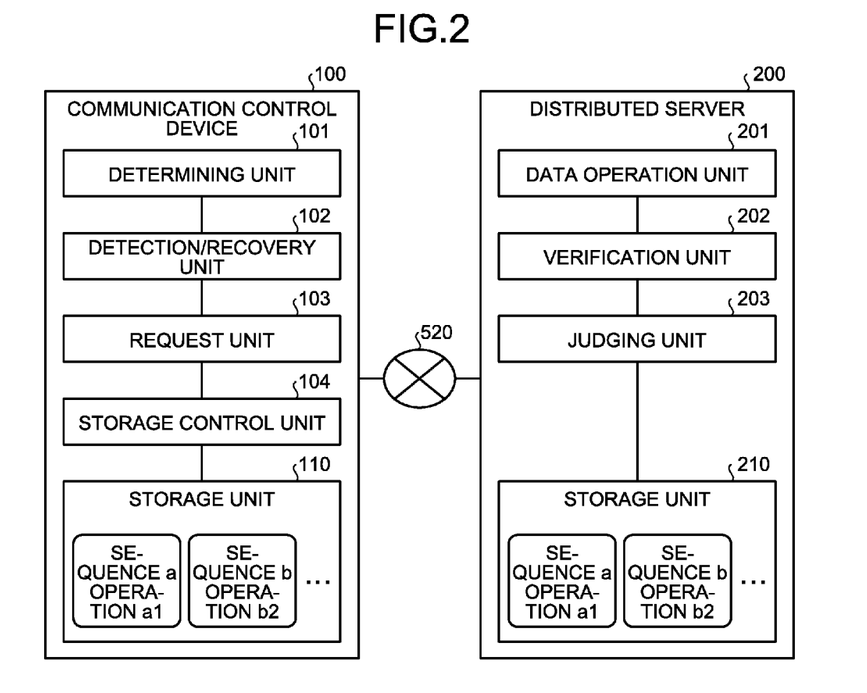
FIG. 2 is a block diagram illustrating a functional configuration example of a communication control device and a distributed server according to the present embodiment.

FIG. 2 is a block diagram illustrating a functional configuration example of the communication control device 100 and the distributed server 200 according to the present embodiment. As illustrated in FIG. 2, the communication control device 100 includes a determining unit 101, a detection/recovery unit 102, a request unit 103, a storage control unit 104, and a storage unit 110.

The storage unit 110 stores therein data used for various kinds of processing executed by the communication control device 100. For example, the storage unit 110 stores therein state information (operation sequence) indicating a state of data operation. As described above, the operation sequence is stored in common to the storage unit 110 in the communication control device 100 and a storage unit 210 (described later) in the distributed server 200.

In the example in FIG. 2, the operation sequence includes information ("sequence a" and "sequence b") identifying the operation sequence and information ("operation a1" and "operation b2") identifying the last executed operation. The data structure of the operation sequence is not limited thereto. The operation sequence may employ any data structure as long as the state of the current data operation can be specified by information for each operation sequence.

The storage control unit 104 controls the writing of data into the storage unit 110 and the reading of data from the storage unit 110. For example, when an operation method of performing a stateful operation is determined, the storage control unit 104 controls processing of storing an operation sequence in the storage unit 110 in data operation.

The determining unit 101 determines a data operation method on the basis of a requested data operation and the schema of a table that stores therein data to be operated by the data operation. For example, the determining unit 101 determines any one of an operation method (first operation method) of storing state information (such as operation sequence) indicating the state of a data operation and an operation method (second operation method) of avoiding storing the state information. For example, the operation method of storing the state information corresponds to a stateful operation involving the control of an execution state. For example, the operation method of avoiding storing the state information corresponds to a stateless operation involving no control of an execution state. It can thus be interpreted that the determining unit 101 determines whether the requested data operation has statelessness.

The determining unit 101 first refers to information obtained from the application server 300, the distributed server 200, and an internal cache of the determining unit 101 to determine the schema corresponding to a table to be operated. The determining unit 101 then refers to the determined schema and a data operation requested from the application server 300 to determine whether the data operation has statelessness.

The determining unit 101 determines different operation methods in accordance with the type of a transaction of the data operation, the presence/absence of a primary key of a table to be operated, the type of the data operation, and the like. For example, when the data operation is a single transaction, the determining unit 101 determines that the data operation is a stateless operation. A single transaction is, for example, an operation for one or more records that has atomicity. Atomicity is the property that guarantees that all of the operations are executed or none of the operations is executed.

When the data operation is not a single transaction, the determining unit 101 may determine whether the table to be operated has a primary key. For example, the determining unit 101 may determine that the data operation is stateless operation when the table to be operated has a primary key. This is because the contents of a table having a primary key are kept the same even after the same operation is repeatedly executed as described above.

When the table to be operated has no primary key, the determining unit 101 may further determine the type of the data operation. For example, the determining unit 101 may determine whether the data operation is an operation of inserting a new record, and may determine that the data operation is stateless operation when the data operation is not an operation of inserting a new record.

Examples of the operation other than the new record insertion operation include acquisition, update, and delete operations for existing records. These operations are each an operation that provides the same processing result irrespective of the processing count (idempotent operation). Thus, for example, data inconsistency does not occur even when the same data operation is repeated upon the occurrence of a failure. Accordingly, no problem occurs if these operations are determined to be stateless operations.

In the case where data to be operated by the data operation is stored in a plurality of tables, the determining unit 101 determines a method for the data operation for each of the tables. The determining unit 101 provides the determination result to the detection/recovery unit 102, the request unit 103, and the storage control unit 104.

The detection/recovery unit 102 detects a failure and determines a procedure necessary for recovery. The detection/recovery unit 102 executes recovery processing when a failure is detected. The detection/recovery unit 102 functions as a recovery unit configured to recover from a failure that has occurred by a recovery method suited to the operation method determined by the determining unit 101. The detection/recovery unit 102 detects a failure in a data operation request for the distributed server 200, for example, via the request unit 103. The detection/recovery unit 102 determines a procedure necessary for recovery processing (such as a retry of request) on the basis of the operation method (presence/absence of statelessness) determined by the determining unit 101 and the state of the operation sequence stored in the storage unit 110.

The request unit 103 issues a request for a data operation to the distributed server 200. In issuing an operation request, the request unit 103 adds identification information on the schema determined by the determining unit 101 to the operation request. When the determining unit 101 determines that the data operation is a stateful operation, the request unit 103 assigns the operation sequence stored in the storage unit 110 to the operation request.

The distributed server 200 includes a data operation unit 201, a verification unit 202, a judging unit 203, and a storage unit 210.

The storage unit 210 stores therein data used for various kinds of processing executed by the distributed server 200. For example, the storage unit 210 stores therein state information (operation sequence) indicating the state of the data operation.

The judging unit 203 judges whether the state of the data operation requested from the communication control device 100 matches with the state indicated by the state information stored in the storage unit 210. In other words, the judging unit 203 is a functional unit configured to compare the last operation expected by the operation request from the communication control device 100 with the actually received operation. For example, when a connection failure has occurred between the communication control device 100 and the distributed server 200, the registration operation request that has already been executed is sometimes issued again. In this case, the judging unit 203 judges that the state of the requested registration operation does not match with the state indicated by the stored state information.

The data operation unit 201 executes the data operation requested from the communication control device 100. For example, the data operation unit 201 executes the requested data operation when the judging unit 203 judges that the states match with each other. By skipping the execution of the requested data operation when the states do not match with each other, data inconsistency such as double registration can be avoided.

The verification unit 202 verifies whether the schema of the table that stores therein data to be operated by the data operation, which is transmitted from the communication control device 100, is proper. Specifically, the verification unit 202 verifies whether the schema expected by the data operation requested from the communication control device 100 and the schema of the table that has actually stores data to be operated therein are the same.

As described above, the communication control device 100 switches the communication procedure (operation method) depending on the schema. However, the communication control device 100 does not always issue an operation request on the basis of the latest schema. It is therefore necessary to verify the schema on the distributed server 200 as needed. The verification unit 202 may compare hash representations, which are condensed schemas, or sequential numbers (such as version information) corresponding to change logs of the schemas, instead of comparing the whole of the schemas. In this manner, the verification processing can be implemented more efficiently. In the case where a database in which the schema of the table once defined is not changed or the like is used, the distributed server 200 need not include the verification unit 202, that is, the verification of the schema may be omitted.

The operation sequences necessary for the comparison by the judging unit 203 need to be stored in the communication control device 100 and the distributed server 200 in a symmetric manner. The structural unit of the operation sequence, which can independently manage both records related to the procedure of a series of data operations, is hereinafter referred to as "session". The session needs to be separately stored for each pair of at least the communication control device 100 and the distributed server 200 that stores data to be operated therein. When the distributed server 200 constitutes a part of a master/slave configuration, the session as well as the contents of the operated record needs to be copied between a master and a slave. In the case of sharding, that is, when databases or tables are arranged in some distributed servers in a divided manner, the session needs to be stored in further divided units.

Each session may include one operation sequence, or each session may include a plurality of operation sequences. For example, in the example in FIG. 2, "sequence a" and "sequence b" may be stored in association with different session identification information, or "sequence a" and "sequence b" may be stored in association with single session identification information.

A session that has significantly exceeded a prescribed period with connection to the communication control device 100 being disconnected may be discarded. If a prescribed period has elapsed after a connection failure has occurred in the communication control device 100, a retry of an operation request requiring a session needs to be stopped. This is because if there is no session that stores the operation sequences, the operation sequences cannot be compared and data inconsistency such as double registration may occur.

The comparison of operation sequences can be omitted depending on the type of data operation. For example, the repetition of the same stateless operation does not cause data inconsistency, and the operation sequences need not be compared in this case. Thus, it is not necessary to build or discard a session necessary for comparison, and it is not necessary to store the operation contents.

Each unit (determining unit 101, detection/recovery unit 102, request unit 103, storage control unit 104, data operation unit 201, verification unit 202, and judging unit 203) in the communication control device 100 and the distributed server 200 may be implemented by one or more processing devices such as a central processing unit (CPU) executing a computer program, that is, by software, may be implemented by hardware such as one or more integrated circuits (IC), or may be implemented by a combination of software and hardware.

The storage unit 110 and the storage unit 210 can be configured by any commonly used storage medium, such as a hard disk drive (HDD), an optical disc, a memory card, and a random access memory (RAM).

Figure 3:
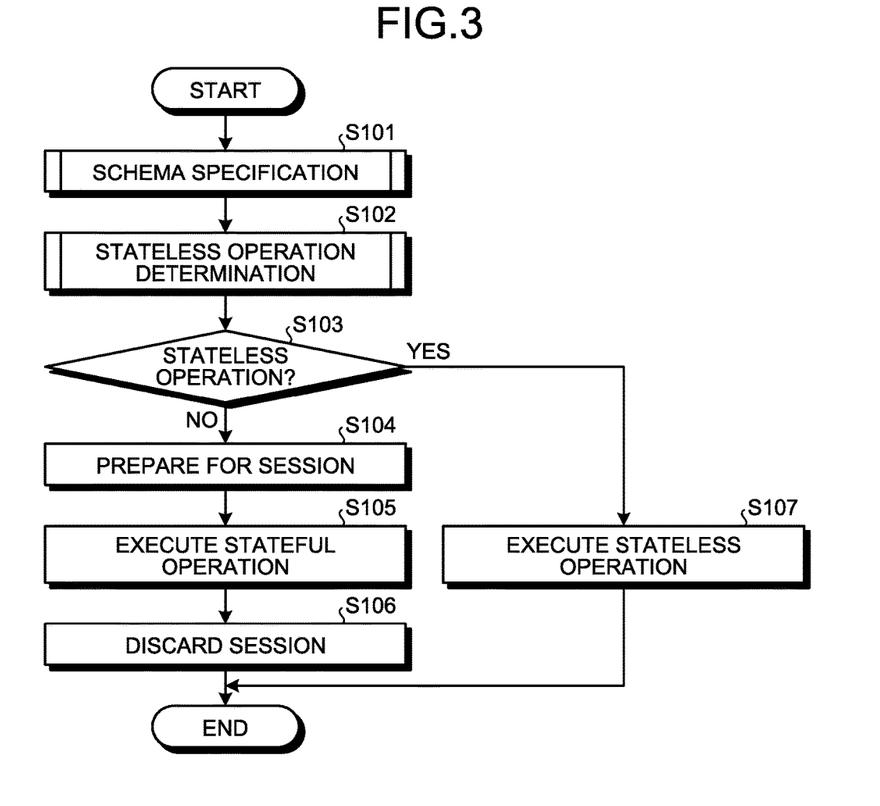
FIG. 3 is a flowchart illustrating an example of data operation processing according to the present embodiment.

Next, data operation processing executed by the communication system according to the present embodiment configured as described above is described with reference to FIG. 3. FIG. 3 is a flowchart illustrating an example of data operation processing according to the present embodiment.

Upon the reception of a request for data operation from the application server 300, the determining unit 101 specifies the schema of a table that stores therein data subjected to the data operation (Step S101). Details of the schema specifying processing are described later. Next, the determining unit 101 refers to the specified schema and the requested data operation to determine whether the data operation is a stateless operation (Step S102). Details of the stateless operation determination processing are described later.

The determining unit 101 determines whether the determination result indicates a stateless operation (Step S103). When the determination result does not indicate a stateless operation, that is, when the determination result indicates a stateful operation (No at Step S103), the request unit 103 requests the distributed server 200 and the storage control unit 104 to prepare a session for storing an operation sequence (Step S104). For example, the request unit 103 receives identification information on a session generated by the judging unit 203 in the distributed server 200 in response to the request, and stores the session identification information in the storage unit 110 via the storage control unit 104.

The request unit 103 requests the distributed server 200 to execute the data operation requested from the application server 300 (Step S105). At this time, the request unit 103 also transmits information on an operation sequence corresponding to the current session to the distributed server 200. The operation sequence information is used for the judging unit 203 in the distributed server 200 to determine the consistency of states.

When a normal response from the distributed server 200 can be acknowledged, the request unit 103 discards the session (Step S106). The generation and discard of the session, which are performed before and after the stateful operation, may be omitted between a plurality of stateful operations in order to reduce the number of communications. In other words, one session may be used in common among a plurality of operation sequences.

When it is determined at Step S103 that the requested data operation is a stateless operation (Yes at Step S103), the request unit 103 requests the distributed server 200 to execute the data operation requested from the application server 300 without transmitting the operation sequence information together (Step S107).

Figure 4:
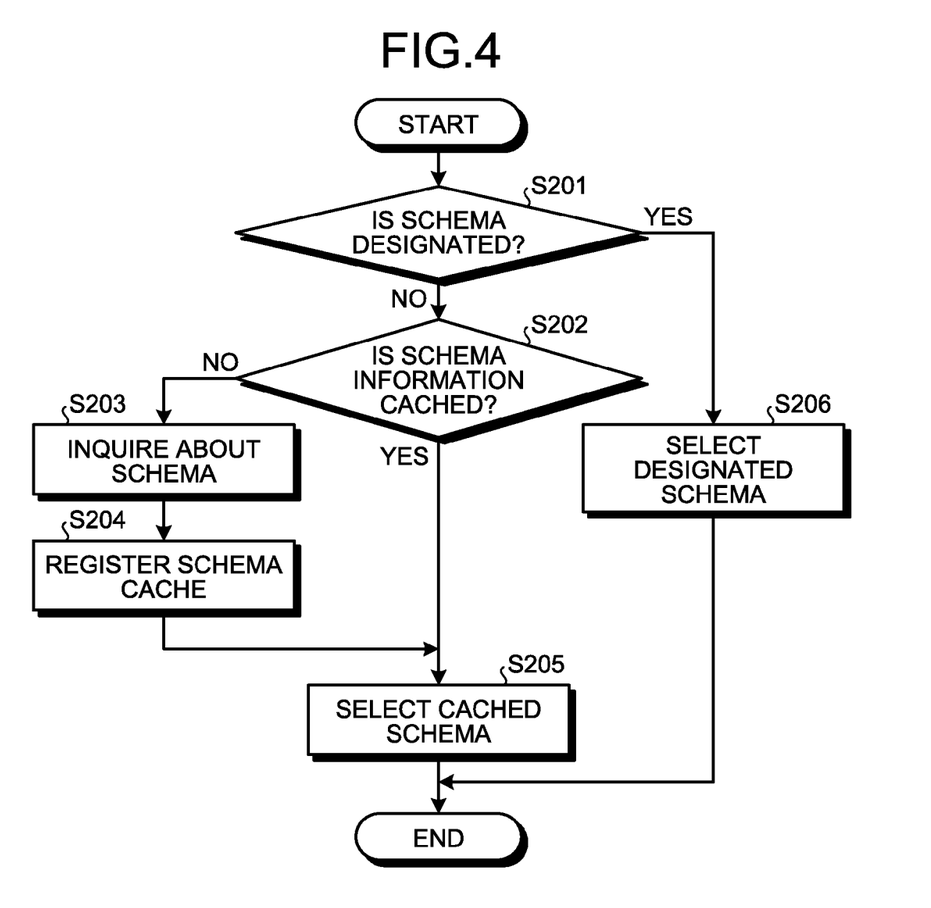
FIG. 4 is a flowchart illustrating an example of schema specifying processing according to the present embodiment.

Next, the schema specifying processing at Step S101 is described. FIG. 4 is a flowchart illustrating an example of the schema specifying processing according to the present embodiment.

For example, the schema can be specified by making an inquiry to the distributed server 200. For another example, the schema can be specified by referring to information (such as a request for data operation) transmitted from the application server 300. For example, in the case where an application that statically presumes the schema involving object/relational (O/R) mapping is used, the determining unit 101 can specify the schema from the class structure of data to be operated. For example, in the case where the reflection function can be used as represented by Java (trademark), the determining unit 101 can specify the schema of a table corresponding to a class in question by referring to definitions such as methods that structure the class, field names and types, and annotations.

The determining unit 101 determines whether a schema is designated from a request source of the data operation (such as the application server 300) in a similar manner to using O/R mapping (Step S201). When a schema is designated (Yes at Step S201), the determining unit 101 directly receives and selects the designated schema (Step S206).

When a schema is not designated (No at Step S201), the determining unit 101 determines whether information indicating a schema (schema information) is stored (cached) in advance in the storage unit 110 or other storage media (Step S202). For example, when the determining unit 101 inquires about the schema of the table to the distributed server 200, the determining unit 101 stores information identifying the table (such as table name) and schema information obtained as a result of the inquiry in the storage unit 110 or other storage media in association with each other. In this manner, in Step S202, the determining unit 101 can specify the schema of the table to be operated by referring to the information stored in advance.

When the schema information has already been cached (Yes at Step S202), the determining unit 101 selects the cached schema (Step S205). When a cache of the schema is not found (No at Step S202), the determining unit 101 inquires the latest schema of the distributed server 200 (Step S203). The determining unit 101 registers information obtained as a result of the inquiry in a predetermined storage device such as the storage unit 110 (Step S204), and selects the obtained schema (Step S205).

Figure 5:
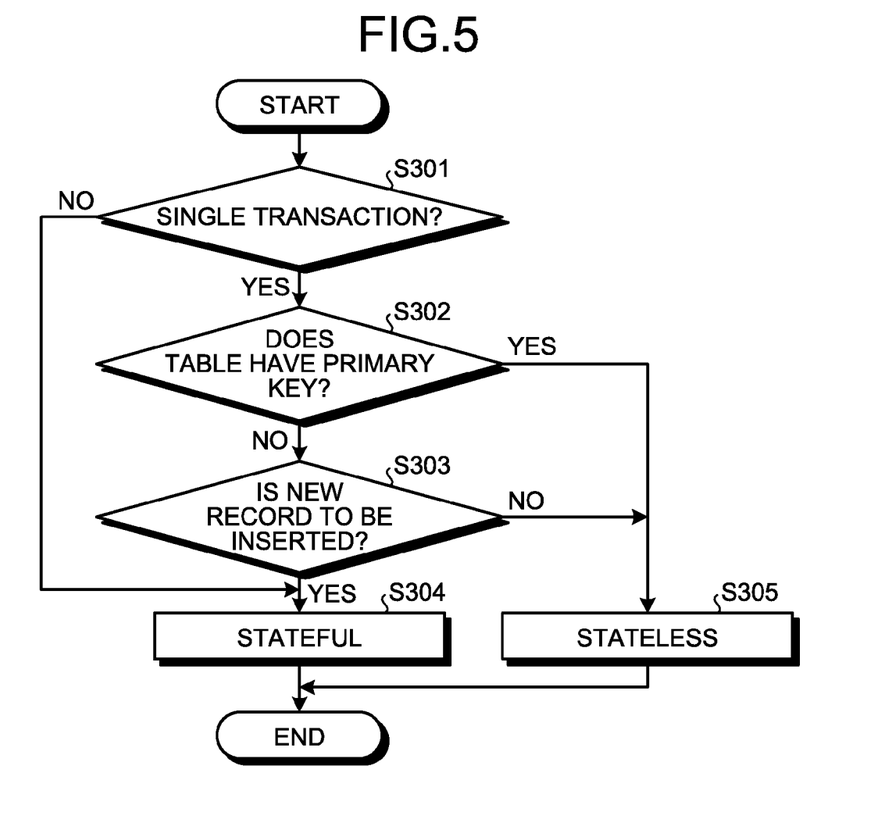
FIG. 5 is a flowchart illustrating an example of stateless operation determination processing according to the present embodiment.

Next, the stateless operation determination processing at Step S102 is described. FIG. 5 is a flowchart illustrating an example of the stateless operation determination processing in the present embodiment.

The determining unit 101 determines whether a requested data operation is a single transaction (Step S301). When the data operation is not a single transaction (No at Step S301), the determining unit 101 determines that the data operation is a stateful operation (Step S304). When the requested data operation is a single transaction (Yes at Step S301), the determining unit 101 further determines whether a primary key exists in a table to be operated (Step S302). For example, the determining unit 101 determines whether a primary key exists in the table by referring to the schema specified by the schema specifying processing.

When a primary key exists (Yes at Step S302), the determining unit 101 determines that the requested data operation is a stateless operation (Step S305). When no primary key exists (No at Step S302), the determining unit 101 determines whether the requested data operation is an operation of inserting a new record (Step S303). As described above, the determining unit 101 may determine whether the data operation is an operation (idempotent operation) whose processing results are the same irrespective of the processing count instead of determining whether the data operation is a new record insertion operation.

When the data operation is not an operation of inserting a new record (No at Step S303), the determining unit 101 determines that the data operation is a stateless operation (Step S305). When the data operation is an operation of inserting a new record (Yes at Step S303), the determining unit 101 determines that the data operation is a stateful operation (Step S304).

The execution order of Step S301 to Step S303 is not limited to the above, and the steps can be executed in any order.

Figure 6:
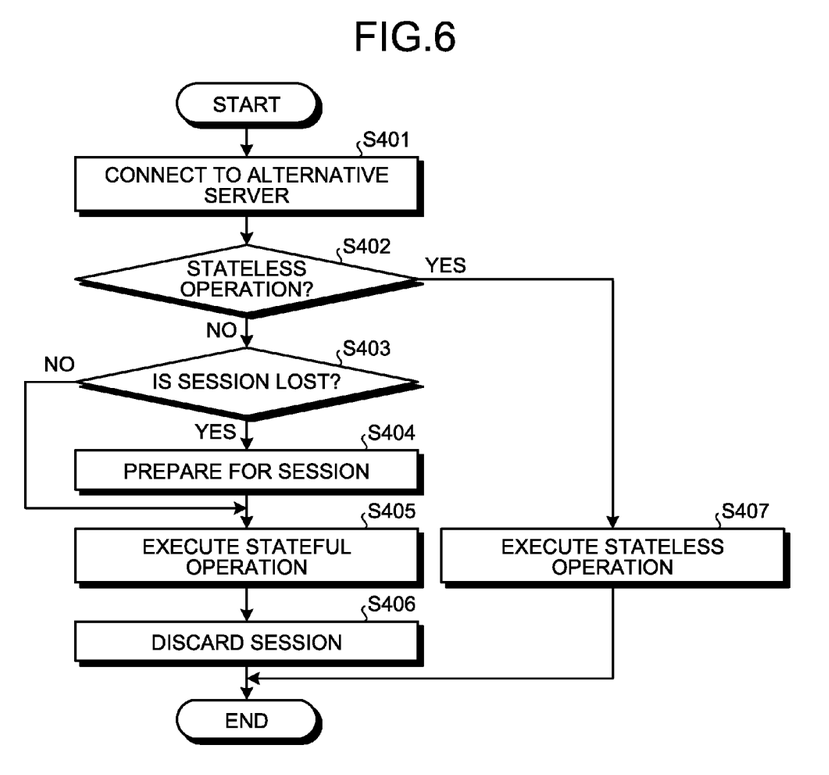
FIG. 6 is a flowchart illustrating an example of failure recovery processing according to the present embodiment.

Next, failure recovery processing according to the present embodiment is described. FIG. 6 is a flowchart illustrating an example of failure recovery processing according to the present embodiment. The detection/recovery unit 102 executes the failure recovery processing when detecting a connection abnormality between the communication control device 100 and the distributed server 200, for example when the detection/recovery unit 102 has failed to receive a heartbeat response from the distributed server 200.

The detection/recovery unit 102 tries to connect to another distributed server 200 (alternative server) serving as an alternative to the distributed server 200 where a failure has occurred (Step S401). When the connection is successful, the detection/recovery unit 102 transitions to the recovery operation of the operation contents. The detection/recovery unit 102 determines whether the immediately preceding data operation is stateless (Step S402). For example, the detection/recovery unit 102 determines whether the data operation is stateless by referring to the result of the stateless operation determination processing by the determining unit 101.

When the data operation is a stateless operation (Yes at Step S402), the detection/recovery unit 102 executes the immediately preceding stateless operation again (Step S407). When the immediately preceding data operation is not a stateless operation, that is, when the immediately preceding data operation is a stateful operation (No at Step S402), the detection/recovery unit 102 determines whether a session is lost (Step S403). For example, the detection/recovery unit 102 determines whether the session is lost by making an inquiry to the distributed server 200.

When the session is lost (Yes at Step S403), the detection/recovery unit 102 prepares a session again (Step S404) and executes a stateful operation (Step S405). When the session is not lost (No at Step S403), the detection/recovery unit 102 uses the state of the existing session to execute a stateful operation (Step S405). In the case where a term of validity is provided for a disconnected session and the session has exceeded the term of validity, the recovery processing is stopped without preparing for a session again. When the completion of the stateful operation can be confirmed, the detection/recovery unit 102 discards the session (Step S406) and completes the failure recovery processing.

Figure 7:
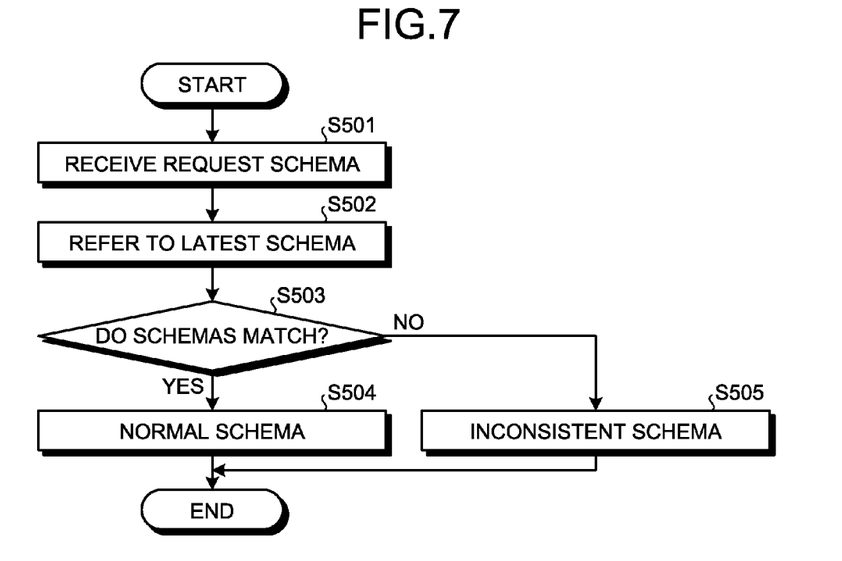
FIG. 7 is a flowchart illustrating an example of schema verification processing according to the present embodiment.

Next, schema verification processing executed by the verification unit 202 in the distributed server 200 is described. FIG. 7 is a flowchart illustrating an example of schema verification processing according to the present embodiment. The schema verification processing is executed when a data operation is requested from the request unit 103 in the communication control device 100 (for example, at Step S105 or Step S107 in FIG. 3).

Each time when a data operation is requested from the communication control device 100, the verification unit 202 receives associated schema information (Step S501). The verification unit 202 refers to the latest schema stored in, for example, the storage unit 210 (Step S502). The verification unit 202 determines whether a schema indicated by the received schema information matches with the latest schema (Step S503). When the schema indicated by the received schema information does not match with the latest schema (No at Step S503), the verification unit 202 determines that the schema is inconsistent (Step S505). Examples of the case where the schema is inconsistent include a case where the schema provided by the application server 300 is improper and a case where the schema is accidentally changed while the communication control device 100 is running. When it is determined that the schema indicated by the received schema information matches with the latest schema (Yes at Step S503), the verification unit 202 determines that the schema is normal (Step S504). When the schema is normal and it is determined as a result of the comparison by the judging unit 203 performed as appropriate that the requested data operation is necessary, the data operation unit 201 executes the requested data operation.

In this manner, the communication system according to the present embodiment switches a method for data operation (operation method) to be applied on the basis of the type of the data operation and the schema of a table to be operated. Accordingly, for example, the data operation for controlling the execution state is executed only if necessary. As a result, high availability, short response time, and ease of development can all be achieved.

Figure 8:
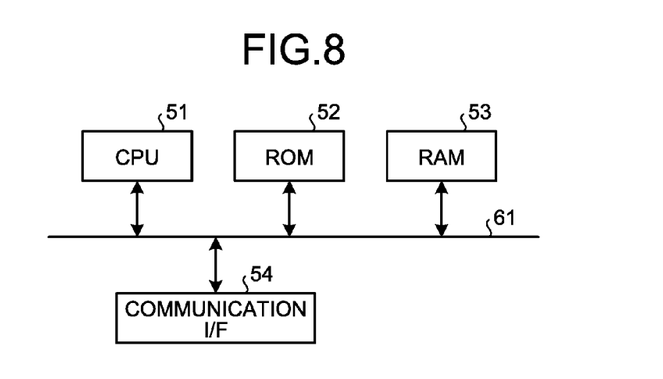
FIG. 8 is an explanatory diagram illustrating a hardware configuration example of devices according to the present embodiment.

Next, a hardware configuration of each device (terminal, application server, communication control device, and distributed server) according to the present embodiment is described with reference to FIG. 8. FIG. 8 is an explanatory diagram illustrating a hardware configuration example of the device according to the present embodiment.

The device according to the present embodiment includes a control device such as a central processing unit (CPU) 51, a storage device such as a read only memory (ROM) 52 and a random access memory (RAM) 53, a communication I/F 54 to be connected to a network for communication, and a bus 61 configured to connect the devices.

A computer program executed by the device according to the present embodiment is embedded in the ROM 52 or other storage media in advance and provided.

The computer program executed by the device according to the present embodiment may be stored in a computer-readable recording medium, such as a compact disc read only memory (CD-ROM), a flexible disk (FD), a compact disc recordable (CD-R), and a digital versatile disc (DVD), as a file in an installable format or an executable format, and provided as a computer program product.

The computer program executed by the device according to the present embodiment may be stored on a computer connected to a network such as the Internet, and provided by being downloaded via the network. The computer program executed by the device according to the present embodiment may be provided or distributed via a network such as the Internet.

The computer program executed by the device according to the present embodiment causes a computer to function as each unit in the device. This computer can execute the computer program by the CPU 51 reading the computer program from a computer-readable storage medium on a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication control device to be connected to a plurality of server devices configured to store therein data in a distributed manner, the communication control device comprising:

a determining unit configured to determine, based on a requested data operation and a schema of a table that stores therein data to be operated by the data operation, any one of a first operation method of storing state information indicating a state of the data operation and a second operation method of avoiding storing the state information as a method for the data operation;

a request unit configured to request the server devices to execute the data operation;

a storage control unit configured to store, when the first operation method is determined, the state information in the storage unit upon execution of the data operation; and a recovery unit configured to recover, when a failure occurs upon the execution of the data operation, from the failure by a recovery method suited to the operation method determined by the determining unit.

2. The communication control device according to claim 1, wherein the recovery unit recovers from the failure by using the stored state information when the first operation method is determined, and recovers from the failure without using the state information when the second operation method is determined.

3. The communication control device according to claim 1, wherein the determining unit determines different operation methods in accordance with whether the table has a primary key.

4. The communication control device according to claim 1, wherein determining unit determines different operation methods in accordance with a type of a transaction executed by the data operation.

5. The communication control device according to claim 1, wherein the determining unit determines an operation method that differs depending on a type of the data operation.

6. The communication control device according to claim 1, wherein, when data to be operated by the data operation is stored in a plurality of tables, the determining unit determines, for each of the tables, an operation method on the basis of the requested data operation and a schema of the table.

7. A communication control method to be executed in a communication control device connected to a plurality of server devices configured to store therein data in a distributed manner, the communication control method comprising:

determining, based on a requested data operation and a schema of a table that stores therein data to be operated by the data operation, any one of a first operation method of storing state information indicating a state of the data operation and a second operation method of avoiding storing the state information as a method for the data operation;

requesting the server devices to execute the data operation;

storing, when the first operation method is determined, the state information in a storage unit upon execution of the data operation; and recovering, when a failure occurs upon the execution of the data operation, from the failure by a recovery method suited to the operation method determined at the determining.

8. A computer program product having a non-transitory computer readable medium including programmed instructions, wherein the instructions, when executed by a computer connected to a plurality of server devices configured to store therein data in a distributed manner, cause the computer to perform:

determining, based on a requested data operation and a schema of a table that stores therein data to be operated by the data operation, any one of a first operation method of storing state information indicating a state of the data operation and a second operation method of avoiding storing the state information as a method for the data operation;

requesting the server devices to execute the data operation;

storaging, when the first operation method is determined, the state information in a storage unit upon execution of the data operation; and recovering, when a failure occurs upon the execution of the data operation, from the failure by a recovery method suited to the operation method determined at the determining.

9. A communication system, comprising:
a plurality of server devices configured to store therein data in a distributed manner; and
a communication control device,
the communication control device comprising:
　a determining unit configured to determine, based on a requested data operation and a schema of a table that stores therein data to be operated by the data operation, any one of a first operation method of storing state information indicating a state of the data operation and a second operation method of avoiding storing the state information as a method for the data operation;
　a request unit configured to request the server devices to execute the data operation;
　a storage control unit configured to store, when the first operation method is determined, the state information in a storage unit upon execution of the data operation; and
　a recovery unit configured to recover, when a failure occurs upon the execution of the data operation, from the failure by a recovery method suited to the operation method determined by the determining unit,
the server devices each comprising:
　a second storage unit configured to store therein the state information;
　a judging unit configured to judge whether a state of a data operation requested from the communication control device matches with a state indicated by the state information stored in the second storage unit; and
　a data operation unit configured to execute the requested data operation when the judging unit judges that the states match with each other.

10. The communication system according to claim 9, wherein the server devices each further comprise a verification unit configured to verify whether the schema of the table that stores therein the data to be operated by the data operation, which is transmitted from the communication control device, is proper.

11. The communication system according to claim 9, wherein when the requested data operation is a data operation for which the first operation method is determined, the judging unit judges whether a state of the requested data operation matches with the state indicated by the state information stored in the second storage unit.

* * * * *